US012573864B2

(12) United States Patent (10) Patent No.: US 12,573,864 B2
Mostoller et al. (45) Date of Patent: Mar. 10, 2026

(54) POWER CONNECTOR SYSTEM

(71) Applicant: TE Connectivity Solutions GmbH,
Schaffhausen (CH)

(72) Inventors: Matthew Edward Mostoller,
Hummelstown, PA (US); **Christopher
George Daily,** Harrisburg, PA (US)

(73) Assignee: TE Connectivity Solutions GmbH
(CH)

( * ) Notice: Subject to any disclaimer, the term of this
patent is extended or adjusted under 35
U.S.C. 154(b) by 796 days.

(21) Appl. No.: 17/942,440

(22) Filed: Sep. 12, 2022

(65) Prior Publication Data

US 2024/0088682 A1     Mar. 14, 2024

(51) Int. Cl.
H02J 7/00     (2006.01)
H01R 4/36     (2006.01)
H01R 13/50     (2006.01)
H01R 13/58     (2006.01)

(52) U.S. Cl.
CPC ............ H02J 7/0042 (2013.01); H01R 4/363
(2013.01); H01R 13/501 (2013.01); **H01R
13/5829 (2013.01); H02J 7/00032** (2020.01)

(58) Field of Classification Search
None
See application file for complete search history.

(56) References Cited

U.S. PATENT DOCUMENTS

| 7,641,504 | B1 | 1/2010 | Padruzzi |
| 10,243,298 | B2 * | 3/2019 | Kawai .................... H01R 12/65 |
| 2012/0171902 | A1 | 7/2012 | Lee |
| 2018/0048091 | A1 | 2/2018 | Kawai et al. |
| 2023/0311687 | A1 * | 10/2023 | Harty .................... H01R 29/00 |

FOREIGN PATENT DOCUMENTS

EP     2955796 A1   12/2015

OTHER PUBLICATIONS

International Search Report, International App. No PCT/IB2023/
059045 International Filing Date Sep. 12, 2023.

* cited by examiner

*Primary Examiner* — Ross N Gushi

(57)     ABSTRACT

A supply charging device for a mobile device includes a
supply power connector having a supply housing having a
mating end at the front mated with a receive power connec-
tor of the mobile device along a mating axis. The supply
power connector has a cable end at the bottom. A supply
contact chamber is at the mating end and a supply cable
chamber is at the cable end. The supply power connector
includes supply power contacts and a data communication
module at the mating end. The supply charging device
includes a cable assembly extending from the cable end at
the bottom of the supply housing. The supply power cables
extend along cable axes oriented non-parallel to the mating
axis.

22 Claims, 14 Drawing Sheets

POWER CONNECTOR SYSTEM

BACKGROUND OF THE INVENTION

The subject matter herein relates generally to power connectors.

Mobile devices, such as autonomous vehicles, mobile robots, or other types of rechargeable mobile vehicles are movable within an environment to perform a task. The mobile devices need to be recharged from time to time. The mobile devices are returned to a charging station to supply power to the mobile device and recharge the batteries of the mobile device. A charging connector may be plugged onto a power connector of the mobile device to recharge the batteries of the mobile device. The charging connector is provided at ends of power cables. The connection between the power contacts of the charging connector at the power cables are susceptible to damage, such as due to stress and strain due to bending of the cables, pulling on the cables, or impact on the connector. The connection between the power cables and the power contacts are permanent connections, such as being welded or crimped. As such, reuse or repair of the power cables and the power contacts is impractical and thus components are unable to be reused when other components are damaged.

A need remains for a robust and reliable charging connector for a mobile device.

BRIEF DESCRIPTION OF THE INVENTION

In one embodiment, a supply charging device for a mobile device is provided. The supply charging device includes a supply power connector having a supply housing extending between a front and a rear. The supply housing has a top and a bottom. The supply power connector has a mating end at the front. The mating end configured to be mated with a receive power connector of the mobile device along a mating axis. The supply power connector has a cable end at the bottom. The supply housing includes a supply contact chamber at the mating end and a supply cable chamber at the cable end. The supply power connector includes supply power contacts in the supply contact chamber for mating with the receive power connector along the mating axis. The supply power connector includes a data communication module at the mating end for electrical connection with the receive power connector. The supply charging device includes a cable assembly coupled to the supply power connector and extending from the cable end at the bottom of the supply housing. The cable assembly includes supply power cables terminated to the corresponding supply power contacts. The supply power cables extending along cable axes oriented non-parallel to the mating axis.

In another embodiment, a supply charging device for a mobile device is provided. The supply charging device includes a supply power connector having a supply housing extending between a front and a rear. The supply housing has a top and a bottom. The supply power connector has a mating end at the front. The mating end configured to be mated with a receive power connector of the mobile device along a mating axis. The supply power connector has a cable end at the bottom. The supply housing includes a supply contact chamber at the mating end and a supply cable chamber at the cable end. The supply power connector includes supply power contacts in the supply contact chamber for mating with the receive power connector along the mating axis, each supply power contact includes a cable clamp includes a cable space between a base and a clamp member. The clamp member moveable relative to the base between a clamped position and a released position, wherein a size of the cable space is smaller in the clamped position. The supply power connector includes a data communication module at the mating end for electrical connection with the receive power connector. The supply charging device includes a cable assembly coupled to the supply power connector and extending from the cable end at the bottom of the supply housing. The cable assembly includes supply power cables terminated to the corresponding supply power contacts. The supply power cables extending along cable axes oriented non-parallel to the mating axis, each supply power cable includes an end received in the cable space of the corresponding cable clamp, wherein the end of the supply power cable is compression connected between the base and the clamp member when in the clamped position.

In a further embodiment, a charging system is provided and includes a mobile charging device having a receive housing extending between a front and a rear. The receive housing has a top and a bottom. The receive power connector has a mating end at the front. The receive power connector has a cable end. The receive housing includes a receive contact chamber at the mating end and a receive cable chamber at the cable end. The receive power connector includes receive power contacts in the receive contact chamber. The receive power connector includes a receive data communication module at the mating end. The mobile charging device includes a receive cable assembly coupled to the receive power connector and extending from the cable end. The receive cable assembly includes receive power cables terminated to the corresponding receive power contacts. The charging system includes a supply charging device including a supply power connector has a supply housing extending between a front and a rear. The supply housing has a top and a bottom. The supply power connector has a mating end at the front. The mating end is mated with the mating end of the receive power connector along a mating axis. The supply power connector has a cable end at the bottom. The supply housing includes a supply contact chamber at the mating end and a supply cable chamber at the cable end. The supply power connector includes supply power contacts in the supply contact chamber for mating with the corresponding receive power contacts along the mating axis. The supply power connector includes a supply data communication module at the mating end for electrical connection with the receive data communication module of the receive power connector. The supply charging device includes a supply cable assembly coupled to the supply power connector and extending from the cable end at the bottom of the supply housing. The supply cable assembly includes supply power cables terminated to the corresponding supply power contacts. The supply power cables extending along cable axes oriented non-parallel to the mating axis.

DETAILED DESCRIPTION OF THE INVENTION

Figure 1:
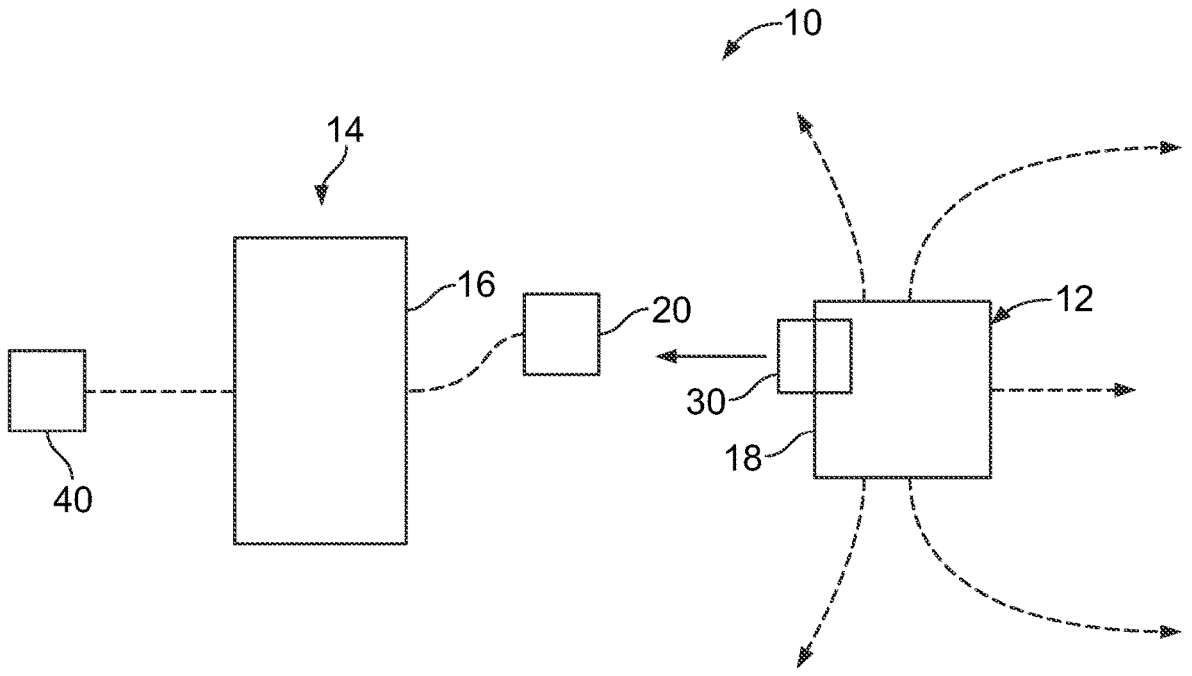
FIG. 1 illustrates a charging system for charging a mobile device in accordance with an exemplary embodiment.

FIG. 1 illustrates a charging system 10 for charging a mobile device 12 in accordance with an exemplary embodiment. The charging system 10 includes a supply charging device 20 and a mobile charging device 30. The mobile charging device 30 is provided on the mobile device 12. The supply charging device 20 is provided on a charging component 14. The charging component 14 may be at a docketing station. The charging component 14 may extend form a wall outlet or charging station 16. The charging component 14 may include a charging plug at an end of a cable bundle. The charging component 14 may be provided in a room or building in a fixed location and the mobile device 12 may be movable within the room or building and returned to the vicinity of the charging station 16 for connection to the charging component 14 to recharge the mobile device 12. The supply charging device 20 receives power from a power supply 40.

In an exemplary embodiment, the mobile device 12 may be an autonomous mobile device that is movable within an environment to perform a task and return to the supply charging device 20 to charge the autonomous mobile device 12. In various embodiments, the mobile device 12 may be a forktruck. In other various embodiments, the mobile device 12 may be a mobile robot, such as for used to perform tasks in a factory, a hotel, a store or another environment. For example, the mobile robot may be used to scan items on shelves, deliver items from one location to another location, or perform other tasks. The mobile charging device 30 is mounted to a body 18 of the mobile device 12.

Figures 2, 3:
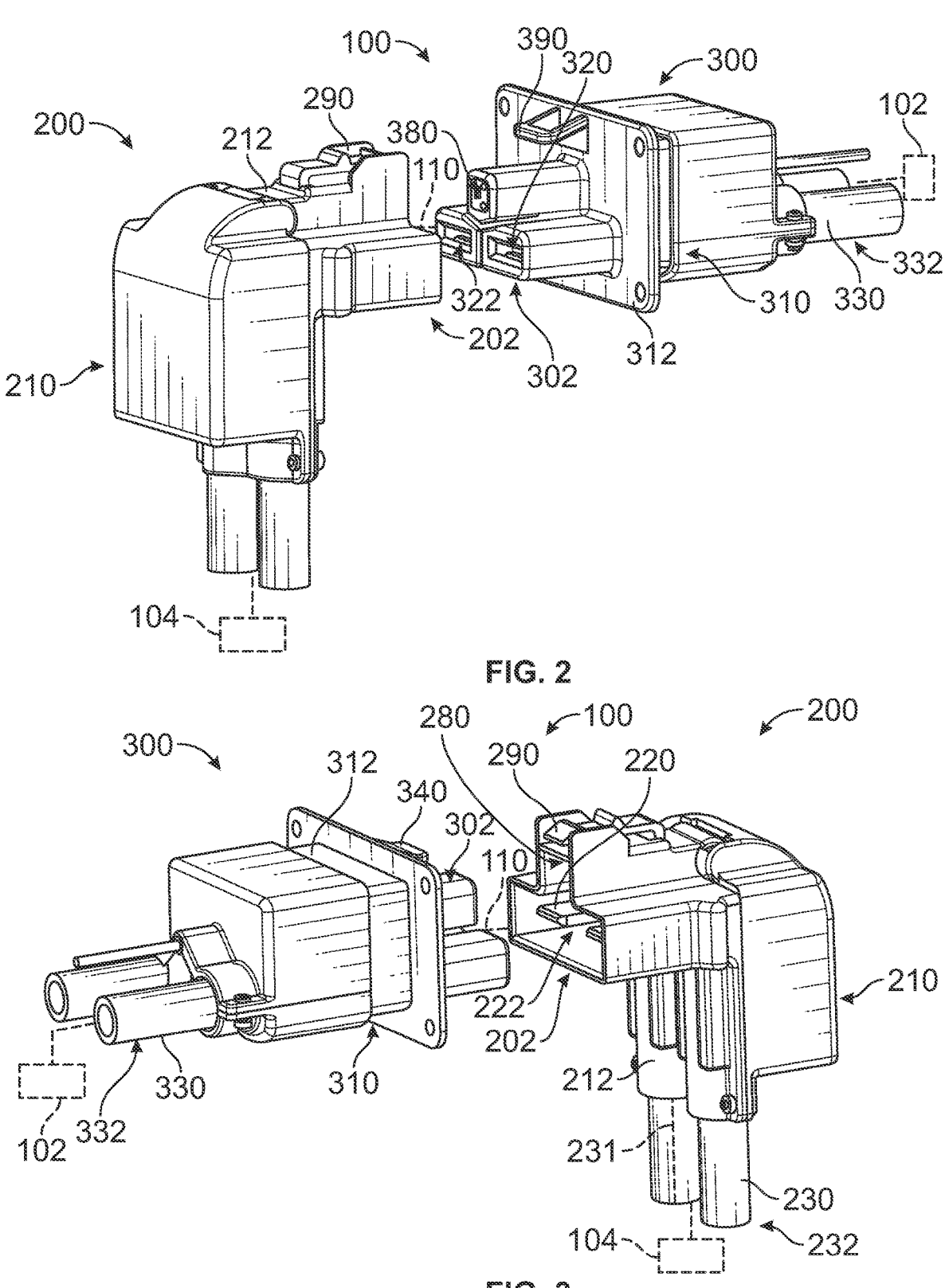
FIG. 2 illustrates a charging system for charging a mobile device in accordance with an exemplary embodiment.
FIG. 3 illustrates the charging system in accordance with an exemplary embodiment.

FIG. 2 illustrates a charging system 100 for charging a mobile device 102 in accordance with an exemplary embodiment. FIG. 3 illustrates the charging system 100 in accordance with an exemplary embodiment. The charging system 100 includes a supply charging device 200 and a mobile charging device 300. FIG. 2 is a front view of the mobile charging device 300. FIG. 3 is a front view of the supply charging device 200. The mobile charging device 300 is provided on the mobile device 102 and includes a mating end 302 configured to be mated with the supply charging device 200. For example, the mobile charging device 300 is coupled to a body or panel of the mobile device 102. The supply charging device 200 is part of a charging component 104 and includes a mating end 202 configured to be mated with the mobile charging device 300. The mating end 202 of the supply charging device 200 is configured to be plugged onto the mating end 302 of the mobile charging device 300.

The mobile charging device 300 receives power from the supply charging device 200 when coupled thereto to charge a battery of the mobile device 102. The mobile charging device 300 includes a receive power connector 310 having a receive housing 312. The receive housing 312 includes a latching feature 390 to secure the supply charging device 200 to the mobile charging device 300. The receive power connector 310 includes a receive contact assembly 322 having a plurality of receive power contacts 320 (FIG. 2). The receive contact assembly 322 is coupled to the receive housing 312. The receive power connector 310 includes a cable assembly 332 having a plurality of receive power cables 330 terminated to the corresponding receive power contacts 320. The receive power connector 310 includes a receive data communication module 380 coupled to the receive housing 312.

The supply charging device 200 includes a supply power connector 210 having a supply housing 212. The supply housing 212 includes a latching feature 290 to secure the supply charging device 200 to the receive charging device 300. The supply power connector 210 includes a supply contact assembly 222 having a plurality of supply power contacts 220 (FIG. 3). The supply contact assembly 222 is coupled to the supply housing 212. The supply power connector 210 includes a cable assembly 232 having a plurality of supply power cables 230 terminated to the corresponding supply power contacts 220. The supply power connector 210 includes a supply data communication module 280 coupled to the supply housing 212 configured to be coupled to the receive data communication module 380.

In an exemplary embodiment, the supply power connector 210 is a right-angle connector having the supply power cables 230 exit the supply housing 212 perpendicular to the mating ends of the supply contacts 220. For example, the supply power cables 230 may extend along cable axes 231 that are perpendicular to a mating axis 110. As such, the cables 230 are able to hang straight downward from the supply power connector 210 when plugged onto the receive power connector 310. As such, pressure and strain on the cables 230 is reduced compared to connectors having the cables extending parallel to the mating axis, which then bend 90° downward rearward of the connector. Such bends in the cables cause strain between the cables and the contacts, which may lead to failure over time. In other embodiments, the supply power cables 230 may exit the supply housing 212 at other angles relative to the mating axis 110. For example, the cable axes 231 may be oriented at an angle that is non-parallel to the mating axis 110. The supply power cables 230 may exit at an angle that is angled downward relative to the mating axis 110. For example, the supply power cables 230 may exit the supply housing 212 at an angle between 30° and 60° relative to the mating axis 110. The supply power cables 230 may exit the supply housing 212 at an angle of approximately 45° relative to the mating axis 110 in various embodiments. Other orientations are possible in alternative embodiments.

Figure 4:
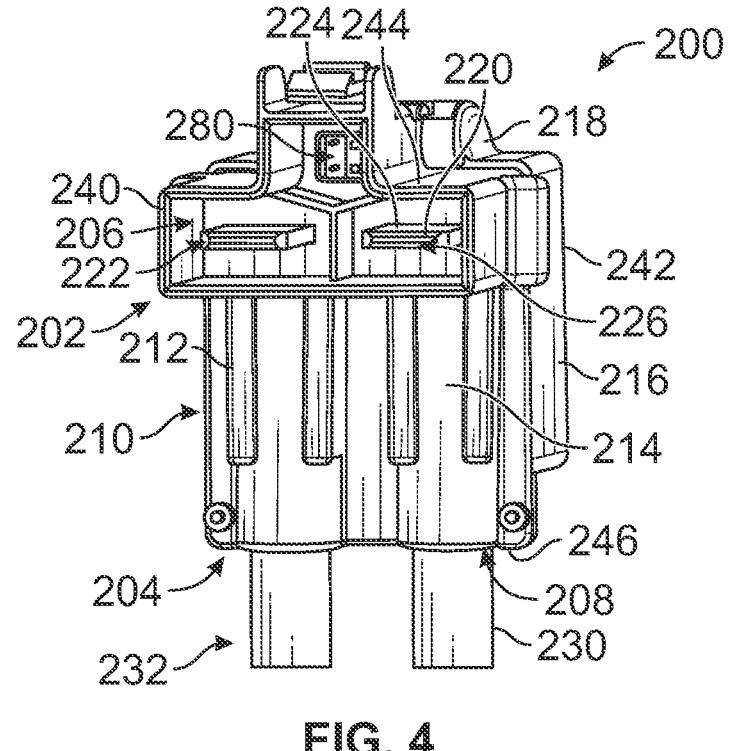
FIG. 4 is a front perspective view of the supply charging device in accordance with an exemplary embodiment.
Figure 5:
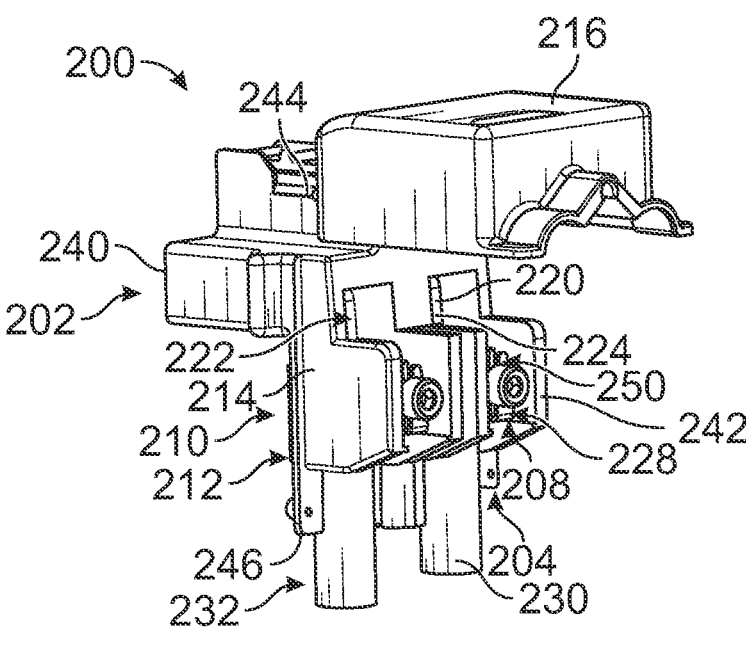
FIG. 5 is a rear perspective view of the supply charging device in accordance with an exemplary embodiment.
Figure 6:
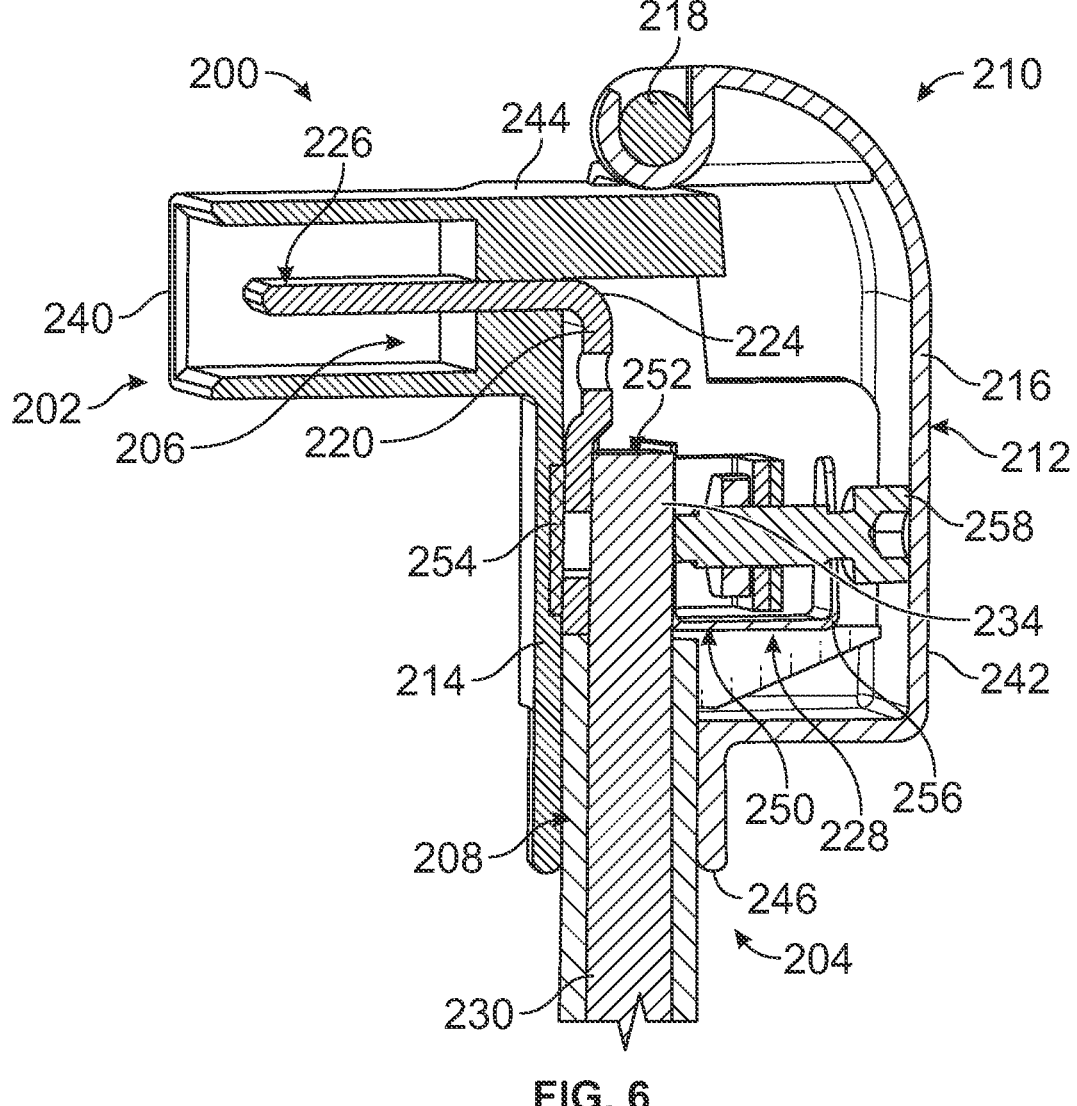
FIG. 6 is a cross-sectional view of the supply charging device in accordance with an exemplary embodiment.

FIG. 4 is a front perspective view of the supply charging device 200 in accordance with an exemplary embodiment. FIG. 5 is a rear perspective view of the supply charging device 200 in accordance with an exemplary embodiment. FIG. 6 is a cross-sectional view of the supply charging device 200 in accordance with an exemplary embodiment. The supply charging device 200 includes the supply power connector 210, the supply contact assembly 222, the supply cable assembly 232, and the supply data communication module 280.

The supply housing 212 includes a main body 214 and a cover 216 coupled to the main body 214. In various embodiments, the cover 216 may be rotatably coupled to the main body 214. The supply housing 212 includes a front 240 and a rear 242. The supply housing 212 includes a top 244 and a bottom 246. In an exemplary embodiment, the mating end 202 is at the front 240 of the supply housing 212 and a cable end 204 of the supply power connector 210 is at the bottom 246 of the supply housing 212. The cables 230 enter/exit the supply housing 212 at the bottom 246.

In an exemplary embodiment, the supply housing 212 includes a supply contact chamber 206 that receives the supply power contacts 220 and a supply cable chamber 208 that receives the supply power cables 230. The supply contact chamber 206 extends through the main body 214 of the supply housing 212 between the front 240 and the rear 242. The supply power contacts 230 may be loaded into the supply contact chamber 206 through the rear 242. Optionally, portions of the supply power contacts 230 may be located within the supply cable chamber 208 to connect with the supply power cables 230. The supply cable chamber 208 is located at the rear 242. The supply cable chamber 208 is open at the bottom 246 to receive the cables 230. In the illustrated embodiment, the supply contact chamber 206 extends generally horizontally and the supply cable chamber 208 extends generally vertically. As such, the cables 230 are able to extend from the bottom 246 (for example, generally perpendicular to the supply power contacts 220). In an exemplary embodiment, the supply power contacts 220 are right-angle contacts extending into the supply cable chamber 208, which allows the supply power cables 230 to extend along linear paths through the supply cable chamber 208 to the bottom 246 of the supply housing 212. The supply power cables 230 do not include bends within the supply housing 212.

Each supply power contact 220 includes a body 224 extending between a mating end 226 and a terminating end 228. In an exemplary embodiment, the body 224 is stamped and formed. The mating end 226 is configured to be mated with the receive power connector 310 (shown in FIG. 2). In the illustrated embodiment, the mating end 226 is a blade contact. The body 224 is flat at the mating end 226. Other types of contacts may be provided at the mating end 226, such as a pin, a socket, a spring beam, and the like. In an exemplary embodiment, the body 224 includes a 90° bend between the mating end 226 and the terminating end 228. As such, the terminating end 228 is oriented perpendicular to the mating end 226. The terminating end 228 extends into the supply cable chamber 208 for connection to the supply power cable 230. The terminating end 228 may be oriented at other non-parallel angles relative to the mating end 226, such as at an angle between 30° and 60°.

Figures 7, 8:
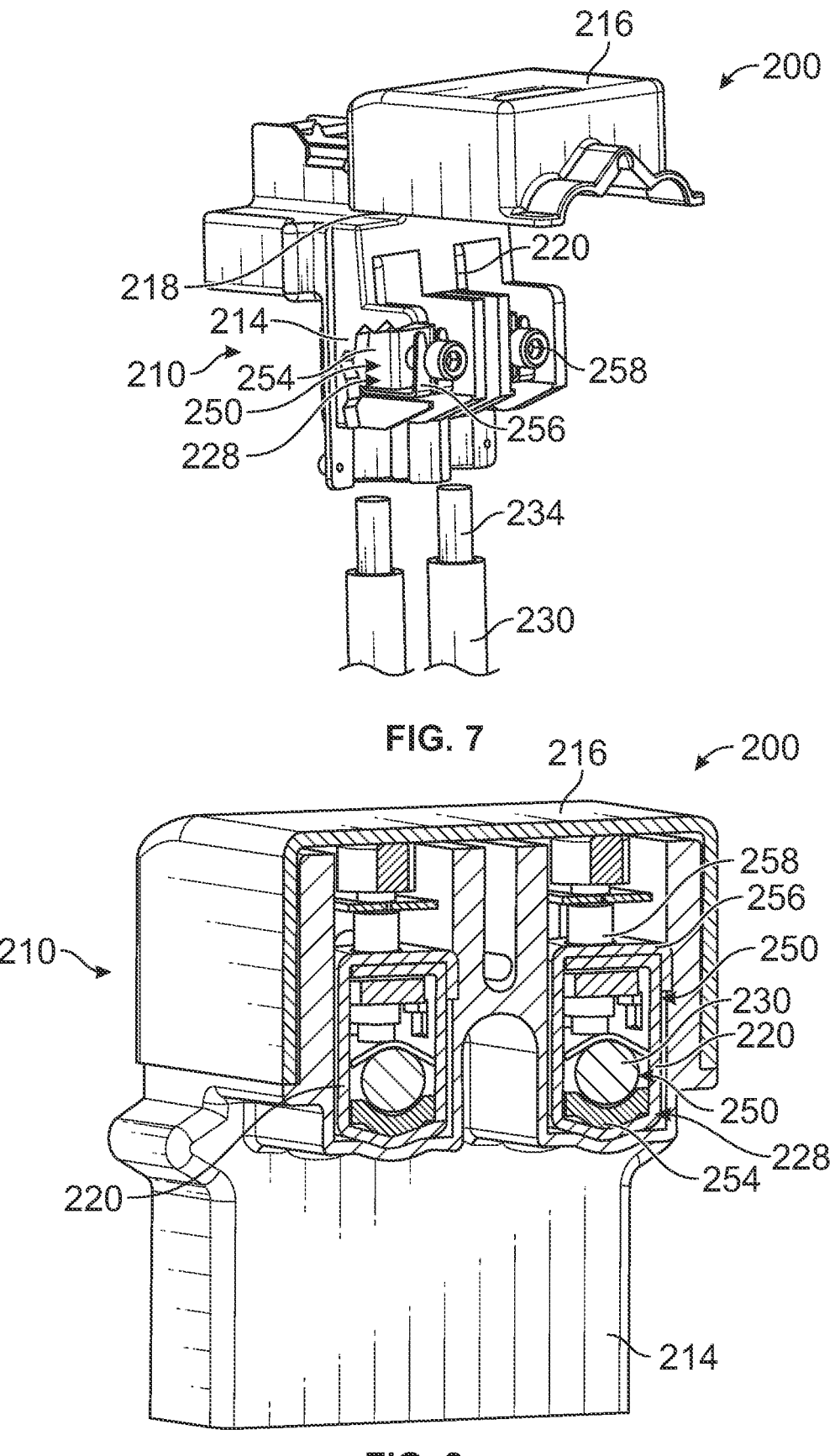
FIG. 7 is a rear, exploded, partial sectional view of the supply charging device in accordance with an exemplary embodiment.
FIG. 8 is a bottom perspective, partial sectional view of the supply charging device in accordance with an exemplary embodiment.

With additional reference to FIGS. 7 and 8, FIG. 7 is a rear, exploded, partial sectional view of the supply charging device 200 in accordance with an exemplary embodiment and FIG. 8 is a bottom perspective, partial sectional view of the supply charging device 200 in accordance with an exemplary embodiment. FIGS. 7 and 8 show the terminating ends 228 of the supply power contacts 220. In an exemplary embodiment, the terminating end 228 includes a separable terminating interface for terminating to the supply power cable 230. The supply power cable 230 may be mated to and unmated from the separable terminating interface, such as for repair or replacement of the supply power connector 210 or the supply power cables 230.

In an exemplary embodiment, the supply power contact 220 includes a cable clamp 250 at the terminating end 228. The cable clamp 250 has a cable space 252 between a base 254 and a clamp member 256. The clamp member 256 is movable relative to the base 254 between a clamped position (FIG. 8) and a released position (FIG. 7). A size of the cable space 252 is smaller in the clamped position and larger in the released position. An end 234 of the supply power cable 230 is loadable into and removable from the cable clamp 250 in the released position. The supply power cable 230 is mechanically and electrically connected to the cable clamp 250 between the base 254 and the clamp member 256 when in the clamped position. In an exemplary embodiment, the cable clamp 250 includes a set screw 258 operably coupled between the base 254 and the clamp member 256. The set screw 258 is tightened to move the clamp member 256 from the released position to the clamped position to clamp to the end 234 of the supply power cable 230. The set screw 258 is untightened to move the clamp member 256 from the clamped position to the released position to allow the end 234 of the supply power cable 230 to be removed from the cable clamp 250. Other types of clamps may be used in alternative embodiments. In other embodiments, other types of separable connections may be used at the terminating end 228. In alternative embodiments, the terminating end 228 may be permanently connected to the supply power cable 230, such as using a crimp connection or weld connection.

When the cover 216 is open (FIG. 7), the terminating ends 228 of the supply power contacts 220 are accessible, such as to access the set screws 258 to tighten or loosen the cable clamps 250. After the supply power cables 230 are loaded into the cable clamps 250 and the cable clamps 250 are tightened to the clamped positions, the cover 216 is closed and coupled to the main body 214 to enclose the termination.

The cover 216 may be secured using fasteners, clamps, latches or other securing features. The cover 216 may clamp the supply power cables 230 when closed, such as to provide strain relief for the supply power cables 230. In various embodiments, the cover 216 is rotatably coupled to the main body 214 at a cover axle 218.

Figure 9:
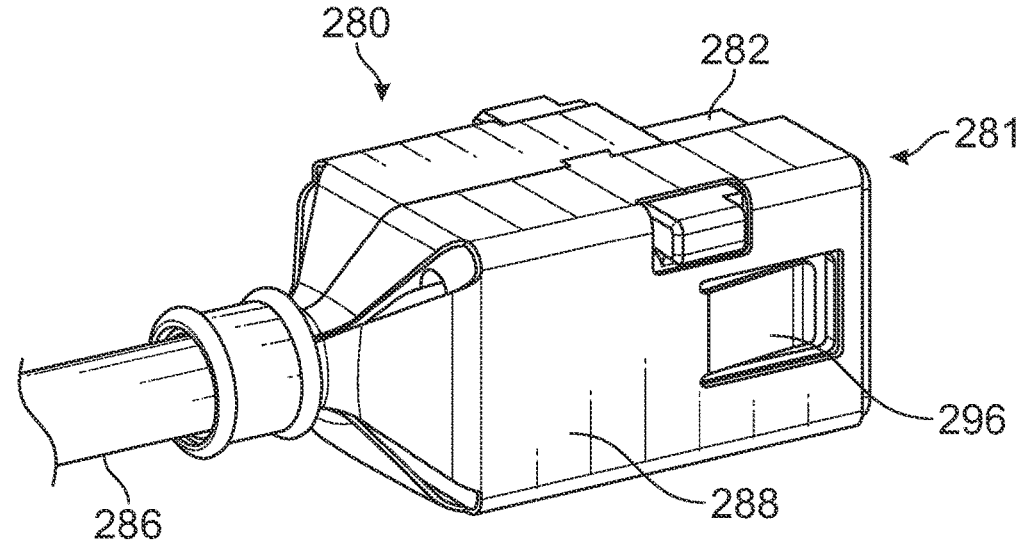
FIG. 9 is a rear perspective view of the data communication module in accordance with an exemplary embodiment.
Figure 10:
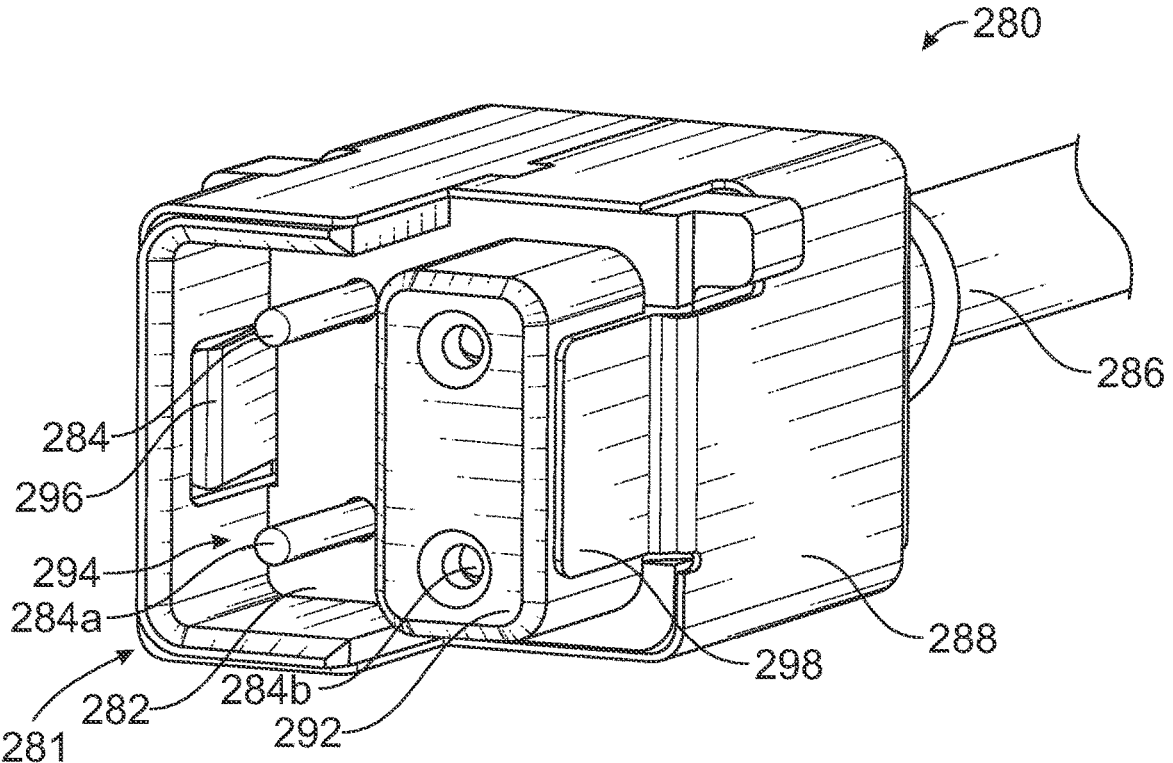
FIG. 10 is a front perspective view of the data communication module in accordance with an exemplary embodiment.

FIG. 9 is a rear perspective view of the data communication module 280 in accordance with an exemplary embodiment. FIG. 10 is a front perspective view of the data communication module 280 in accordance with an exemplary embodiment. The data communication module 280 includes a data communication module housing 282 holding data communication module contacts 284 and data communication module wires 286 extending from the data communication module contacts 284. The data communication module 280 includes a data communication module shield 288 surrounding the data communication module housing 282. The data communication module shield 288 provides electrical shielding for the data communication module contacts 284. The data communication module shield 288 is electrically connected to a wire shield of the data communication module wire 286.

In an exemplary embodiment, the data communication module contacts 284 include pin contacts 284a and socket contacts 284b. For example, the data communication module contacts 284 includes a pair of the pin contacts 284a and a pair of the socket contacts 284b. Other types and/or different numbers of the data communication module contacts 284 may be provided in alternative embodiments. In the illustrated embodiment, the socket contacts 284b are located in an extension 292 of the data communication module housing 282. The pin contacts 284a are located in a pocket 294 of the data communication module housing 282.

In an exemplary embodiment, the data communication module housing 282 and the data communication module contacts 284 form a hermaphroditic mating interface at a mating end 281 of the data communication module 280. The mating end 281 is configured to be mated with the data communication module 380 of the receive power connector 310 (shown in FIG. 2). In an exemplary embodiment, the data communication module shield 288 includes a mating beam 296 and a mating pad 298 at opposite sides of the data communication module housing 282. The mating beam 296 is configured to interface with the mating pad of the receive data communication module 380 to electrically connect the data communication module shield 288 to the receive data communication module 380. The mating pad 298 is configured to receive the mating beam of the receive data communication module 380 to electrically connect the data communication module shield 288 to the receive data communication module 380.

Figure 11:
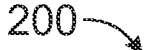
FIG. 11 is a cross-sectional view of the supply charging device in accordance with an exemplary embodiment showing the supply data communication module.
Figure 11:
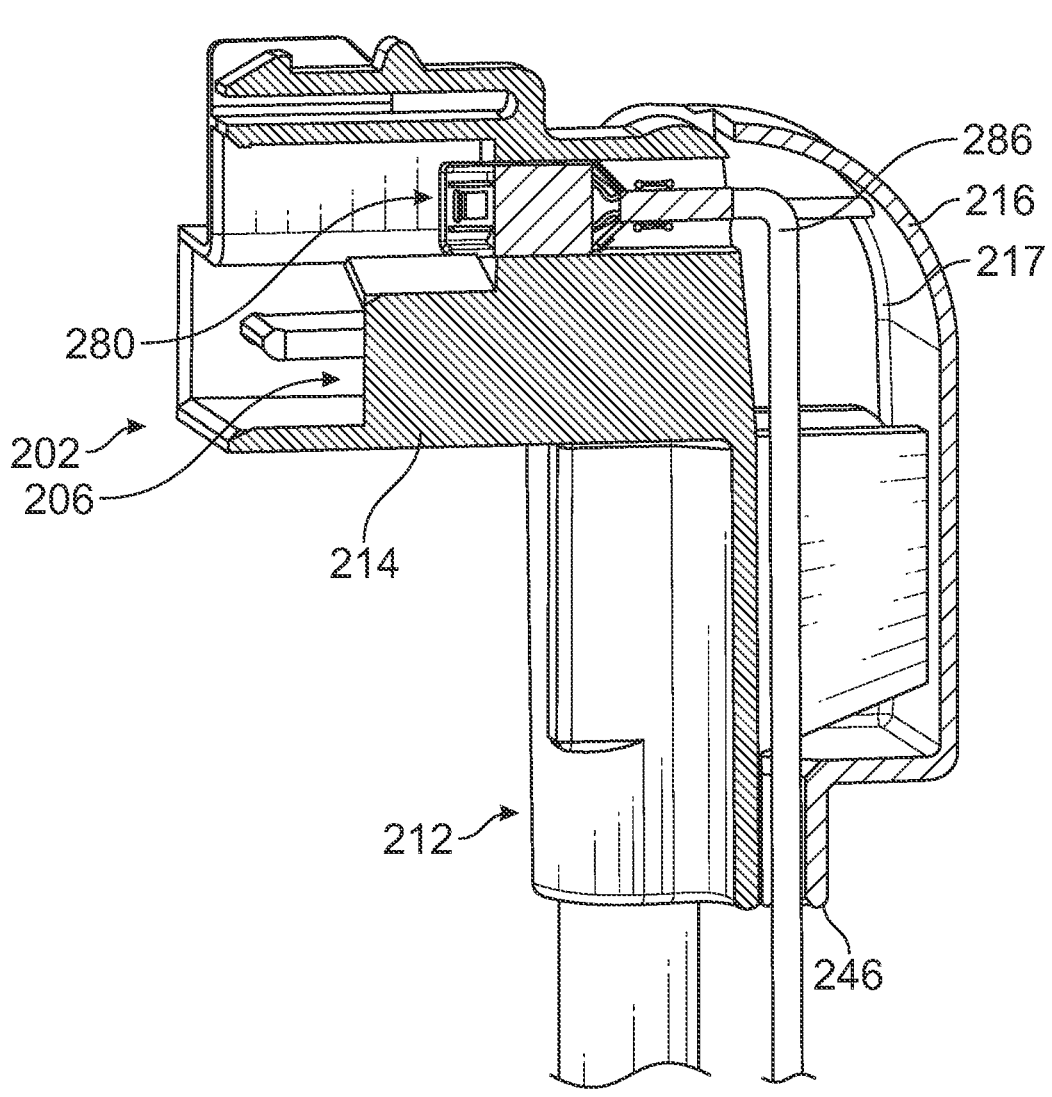

FIG. 11 is a cross-sectional view of the supply charging device 200 in accordance with an exemplary embodiment showing the supply data communication module 280. FIG. 11 shows the data communication module 280 in the supply housing 212.

In an exemplary embodiment, the data communication module 280 is received in the supply contact chamber 206. The data communication module 280 is provided at the mating end 202 for mating with the data communication module of the receive power connector 310 (shown in FIG. 2). The data communication module wire 286 extends from the rear end of the main body 214 into a covered space 217 formed by the cover 216. The data communication module wire 286 is bent 90° in the covered space 217 to extend to the bottom 246 of the supply housing 212. The data communication module wire 286 may be captured between the cover 216 and the main body 214.

Figure 12:
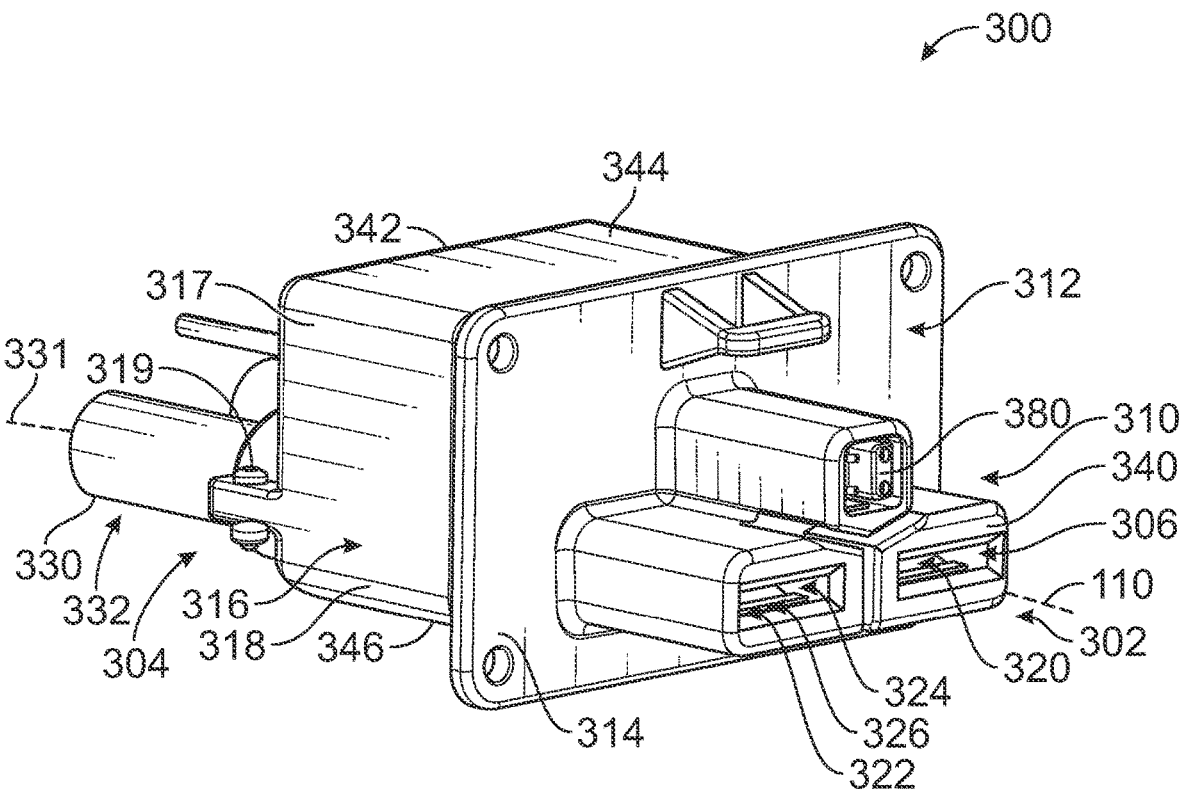
FIG. 12 is a front perspective view of the receive charging device in accordance with an exemplary embodiment.
Figure 13:
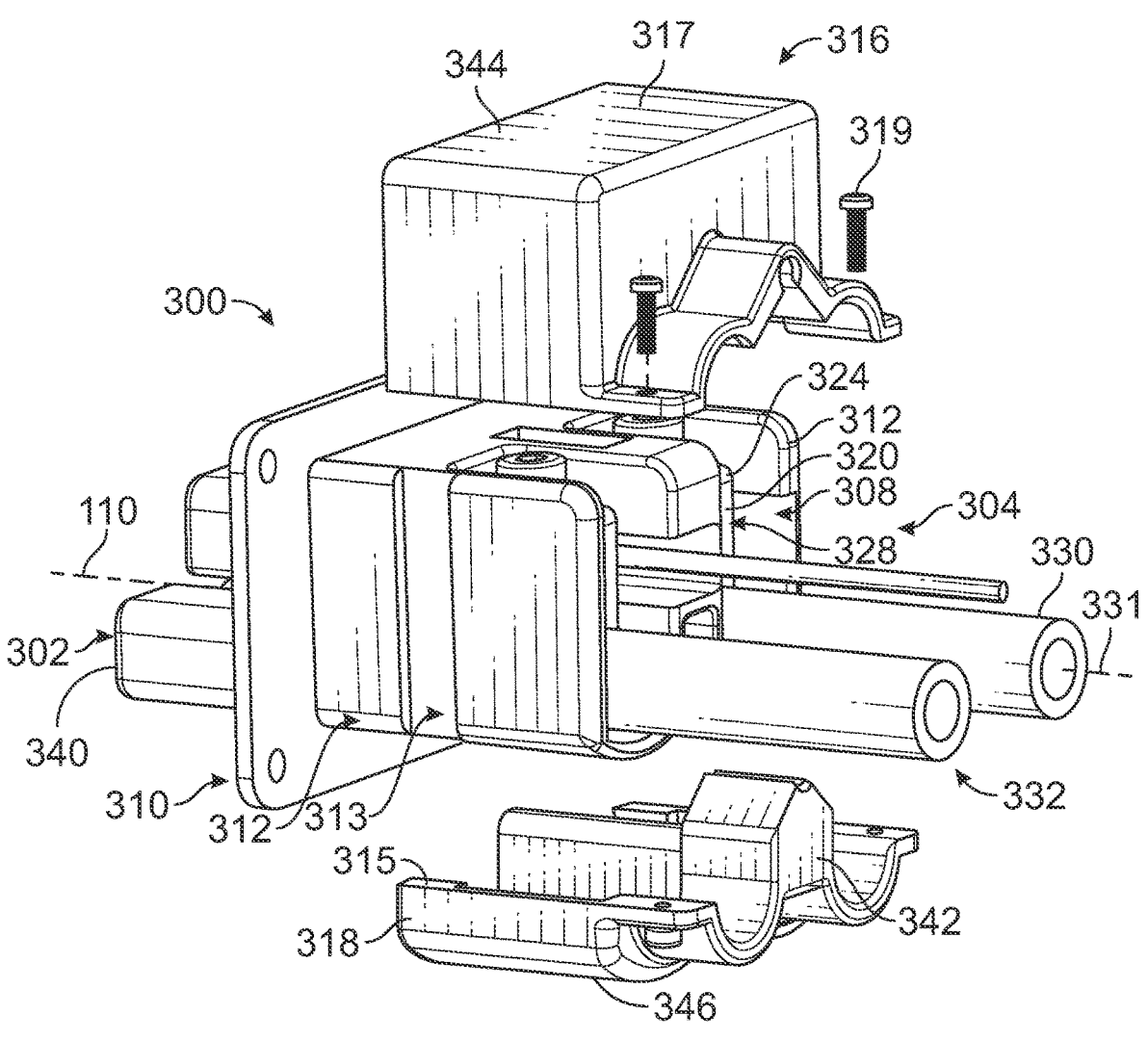
FIG. 13 is a rear perspective, exploded view of the receive charging device in accordance with an exemplary embodiment.

FIG. 12 is a front perspective view of the receive charging device 300 in accordance with an exemplary embodiment. FIG. 13 is a rear perspective, exploded view of the receive charging device 300 in accordance with an exemplary embodiment.

The receive charging device 300 includes the receive power connector 310, the receive contact assembly 322, the receive cable assembly 332, and the receive data communication module 380. In an exemplary embodiment, the receive power connector 310 is a straight connector having the receive power cables 330 exiting the receive housing 312 parallel to the mating ends of the receive contacts 320. For example, the receive power cables 330 may extend along cable axes 331 that are parallel to the mating axis 110. The receive power cables 330 may be routed from the receive power connector 310 to the battery or other component of the mobile device.

The receive housing 312 includes a main body 314 and a cover 316 coupled to the main body 314. In various embodiments, the cover 316 is a multi-piece cover including an upper cover 317 and a lower cover 318. The upper and lower covers 317, 318 are coupled together using fasteners 319. The upper and lower covers 317, 318 are secured to the main body 314, such as using a keyway 313 in the main body and a key 315 in the cover 316. Other securing features may be used in alternative embodiments, such as fasteners, clips, latches, and the like. The upper and lower covers 317, 318 include pockets or channels that receive the receive power cables 330. The receive power cables 330 are configured to be clamped between the upper and lower covers 317, 318.

The receive housing 312 includes a front 340 and a rear 342. The receive housing 312 includes a top 344 and a bottom 346. In an exemplary embodiment, the mating end 302 is at the front 340 of the receive housing 312 and a cable end 304 of the receive power connector 310 is at the rear 342 of the receive housing 312. The cables 330 enter/exit the receive housing 312 at the rear 342. However, in alternative embodiments, the cable end 304 may be at the bottom 346. For example, the receive power connector 310 may be a right-angle connector.

In an exemplary embodiment, the receive housing 312 includes a receive contact chamber 306 that receives the receive power contacts 320 and a receive cable chamber 308 that receives the receive power cables 330. The receive contact chamber 306 extends through the main body 314 of the receive housing 312 between the front 340 and the rear 342. The receive power contacts 330 may be loaded into the receive contact chamber 306 through the rear 342. Optionally, portions of the receive power contacts 330 may be located within the receive cable chamber 308 to connect with the receive power cables 330. The receive cable chamber 308 is located at the rear 342, such as rearward of the receive contact chamber 306. The receive cable chamber 308 is open at the rear 342 to receive the cables 330.

Each receive power contact 320 includes a body 324 extending between a mating end 326 and a terminating end 328. In an exemplary embodiment, the body 324 is stamped and formed. The mating end 326 is configured to be mated with the supply power connector 210 (shown in FIG. 2). In the illustrated embodiment, the mating end 326 is a socket contact. Other types of contacts may be provided at the mating end 326, such as a pin, a blade, a spring beam, and the like.

Figure 14:
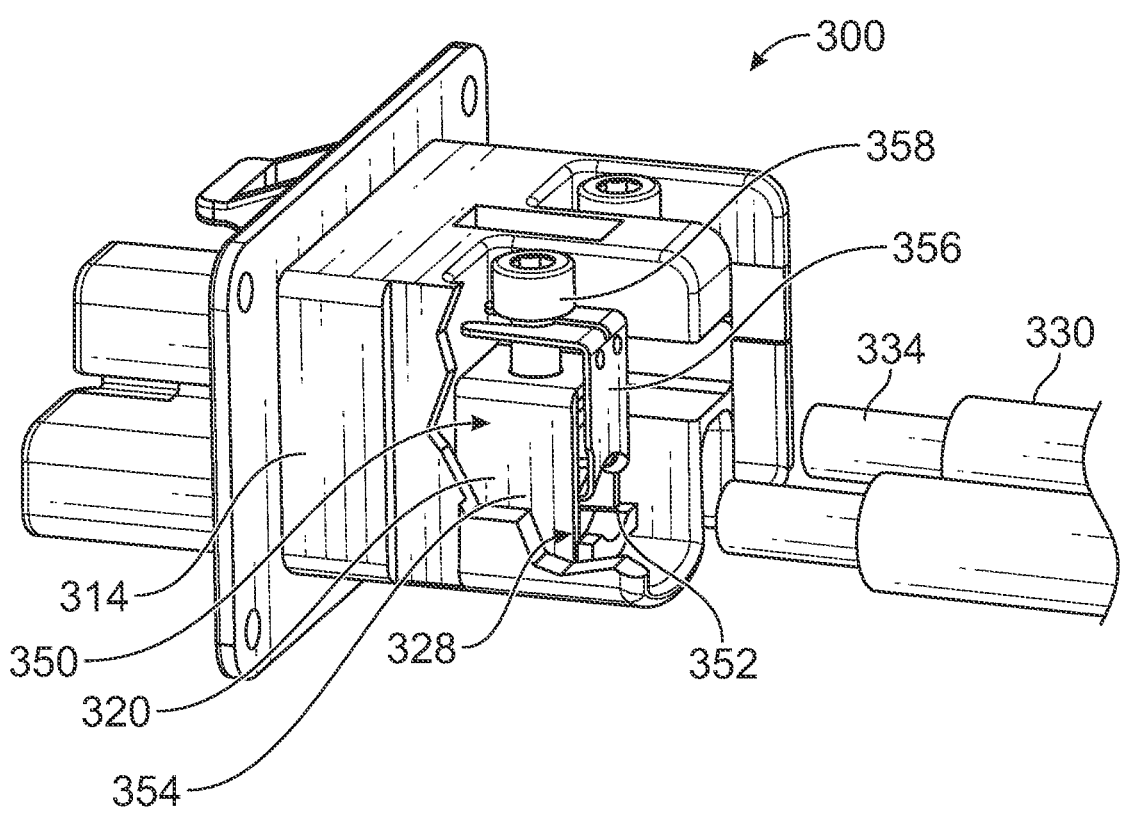
FIG. 14 is a rear perspective, partially sectional view of the receive charging device in accordance with an exemplary embodiment.
Figure 15:
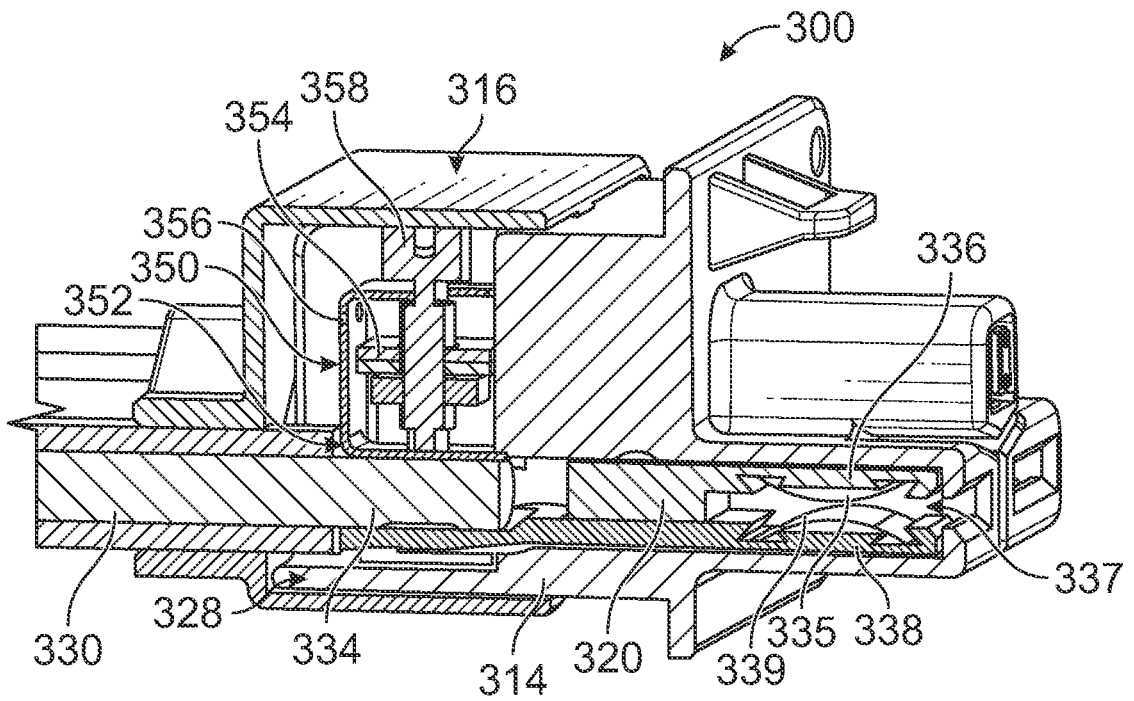
FIG. 15 is a side cross-sectional view of the receive charging device in accordance with an exemplary embodiment.
Figure 16:
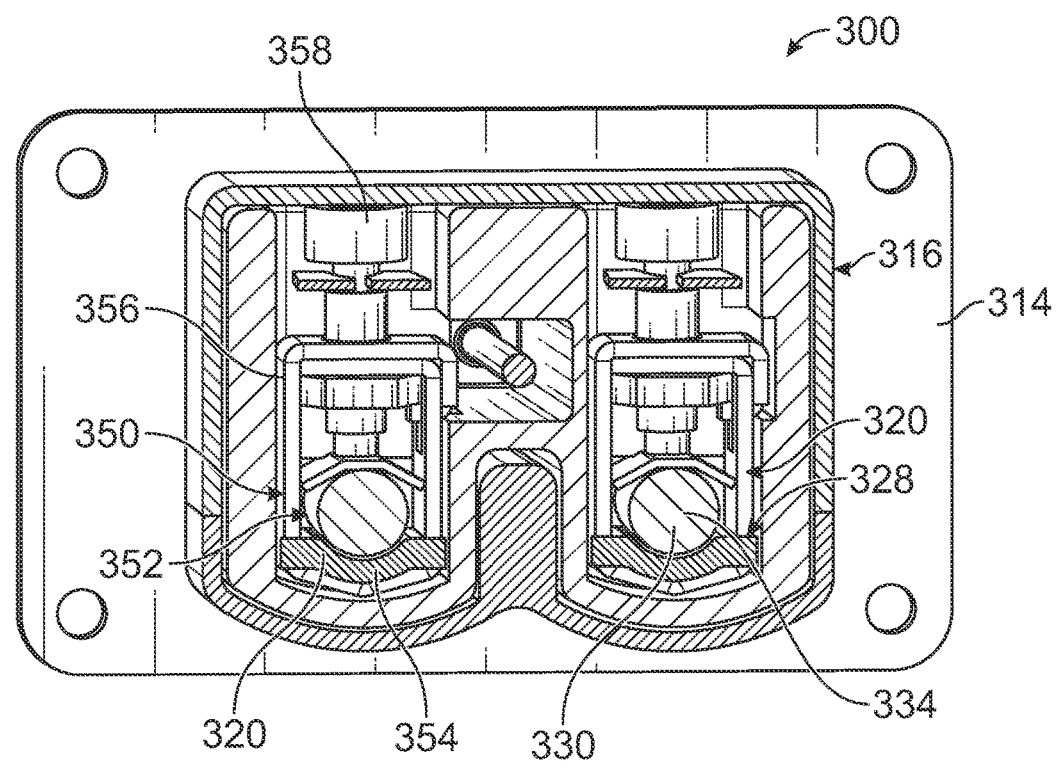
FIG. 16 is an end cross-sectional view of the receive charging device 300 in accordance with an exemplary embodiment.

With additional reference to FIGS. 14-16, FIG. 14 is a rear perspective, partially sectional view of the receive charging device 300 in accordance with an exemplary embodiment, FIG. 15 is a side cross-sectional view of the receive charging device 300 in accordance with an exemplary embodiment, and FIG. 16 is an end cross-sectional view of the receive charging device 300 in accordance with an exemplary embodiment. FIGS. 14-16 show the terminating ends 328 of the receive power contacts 320. In an exemplary embodiment, each terminating end 328 includes a separable terminating interface for terminating to the receive power cable 330. The receive power cable 330 may be mated to and unmated from the separable terminating interface, such as for repair or replacement of the receive power connector 310 or the receive power cables 330.

In an exemplary embodiment, the body 324 of the supply power contact 320, at the mating end 326, includes an upper wall 336 and a lower wall 338 with a socket 337 therebetween. The upper wall 336 includes a spring plate 335 within the socket 337 along the upper wall 336. The lower wall 338 includes a spring plate 339 within the socket 337 along the lower wall 338. The spring plates 335, 339 are compressible. The spring plates 335, 339 have a large surface area efficient electrical connection with the supply power contact 220 (shown in FIG. 4). The spring plates 335, 339 may include individual spring beams.

In an exemplary embodiment, the receive power contact 320 includes a cable clamp 350 at the terminating end 328. The cable clamp 350 has a cable space 352 between a base 354 and a clamp member 356. The clamp member 356 is movable relative to the base 354 between a clamped position (FIGS. 15-16) and a released position (FIG. 14). A size of the cable space 352 is smaller in the clamped position and larger in the released position. An end 334 of the receive power cable 330 is loadable into and removable from the cable clamp 350 in the released position. The receive power cable 330 is mechanically and electrically connected to the cable clamp 350 between the base 354 and the clamp member 356 when in the clamped position. In an exemplary embodiment, the cable clamp 350 includes a set screw 358 operably coupled between the base 354 and the clamp member 356. The set screw 358 is tightened to move the clamp member 356 from the released position to the clamped position to clamp to the end 334 of the receive power cable 330. The set screw 358 is untightened to move the clamp member 356 from the clamped position to the released position to allow the end 334 of the receive power cable 330 to be removed from the cable clamp 350. Other types of clamps may be used in alternative embodiments. In other embodiments, other types of separable connections may be used at the terminating end 328. In alternative embodiments, the terminating end 328 may be permanently connected to the receive power cable 330, such as using a crimp connection or weld connection.

When the cover 316 is open (FIG. 7), the terminating ends 328 of the receive power contacts 320 are accessible, such as to access the set screws 358 to tighten or loosen the cable clamps 350. After the receive power cables 330 are loaded into the cable clamps 350 and the cable clamps 350 are tightened to the clamped positions, the cover 316 is coupled to the main body 314 to enclose the termination. The cover 316 clamps the receive power cables 330 when closed, such as to provide strain relief for the receive power cables 330.

Figure 17:
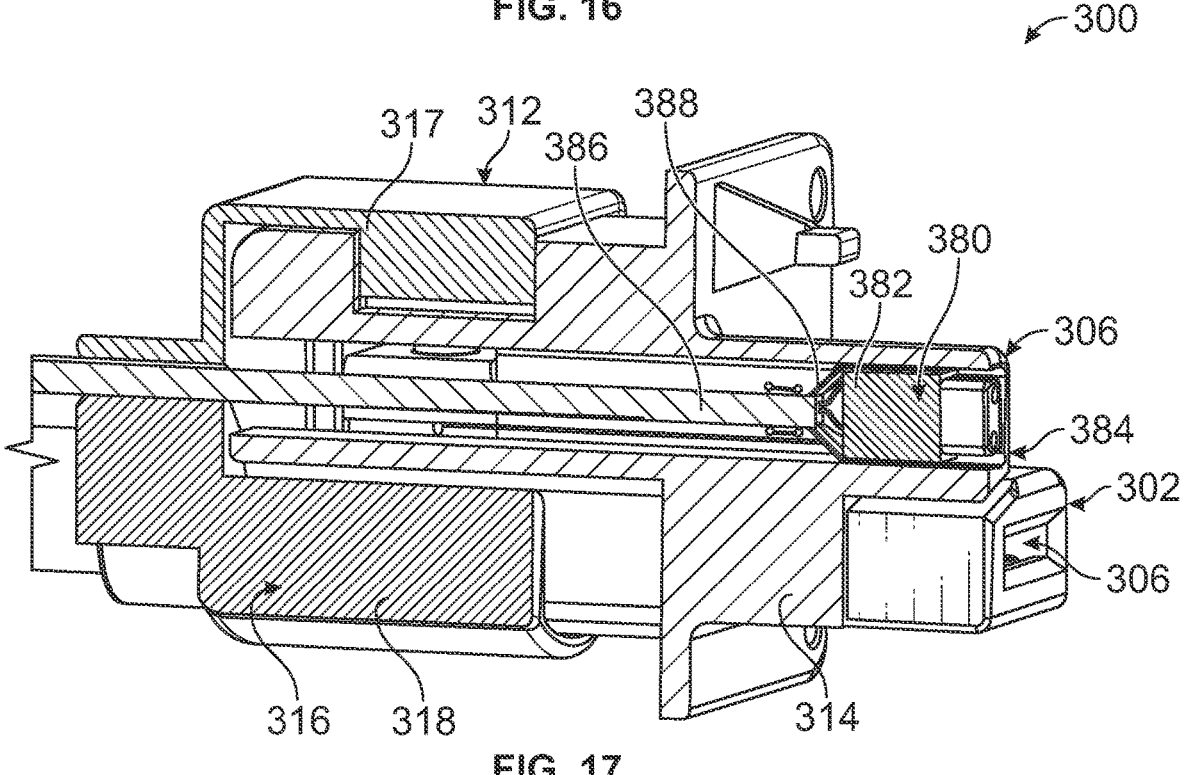
FIG. 17 is a cross-sectional view of the receive charging device in accordance with an exemplary embodiment showing the receive data communication module.

FIG. 17 is a cross-sectional view of the receive charging device 300 in accordance with an exemplary embodiment showing the receive data communication module 380. FIG. 17 shows the data communication module 380 in the receive housing 312. The data communication module 380 may be similar to the data communication module 280 (shown in FIGS. 9-10). In various embodiments, the data communication module 380 may be identical to the data communication module 280. For example, the data communication module 380 and the data communication module 280 may have hermaphroditic mating interfaces.

The data communication module 380 includes a data communication module housing 382 holding data communication module contacts 384 and data communication module wires 386 extending from the data communication module contacts 384. The data communication module 380 includes a data communication module shield 388 surrounding the data communication module housing 382. The data communication module shield 388 provides electrical shielding for the data communication module contacts 384. The data communication module shield 388 is electrically connected to a wire shield of the data communication module wire 386.

In an exemplary embodiment, the data communication module 380 is received in the receive contact chamber 306. The data communication module 380 is provided at the mating end 302 for mating with the data communication module 280 of the supply power connector 210. The data communication module wire 386 extends from the rear end of the main body 314 into a channel or groove of the cover 316. The cover 316 may provide strain relief for the data communication module wire 386. For example, the data communication module wire 386 may be captured between the upper and lower covers 317, 318.

Figure 18:
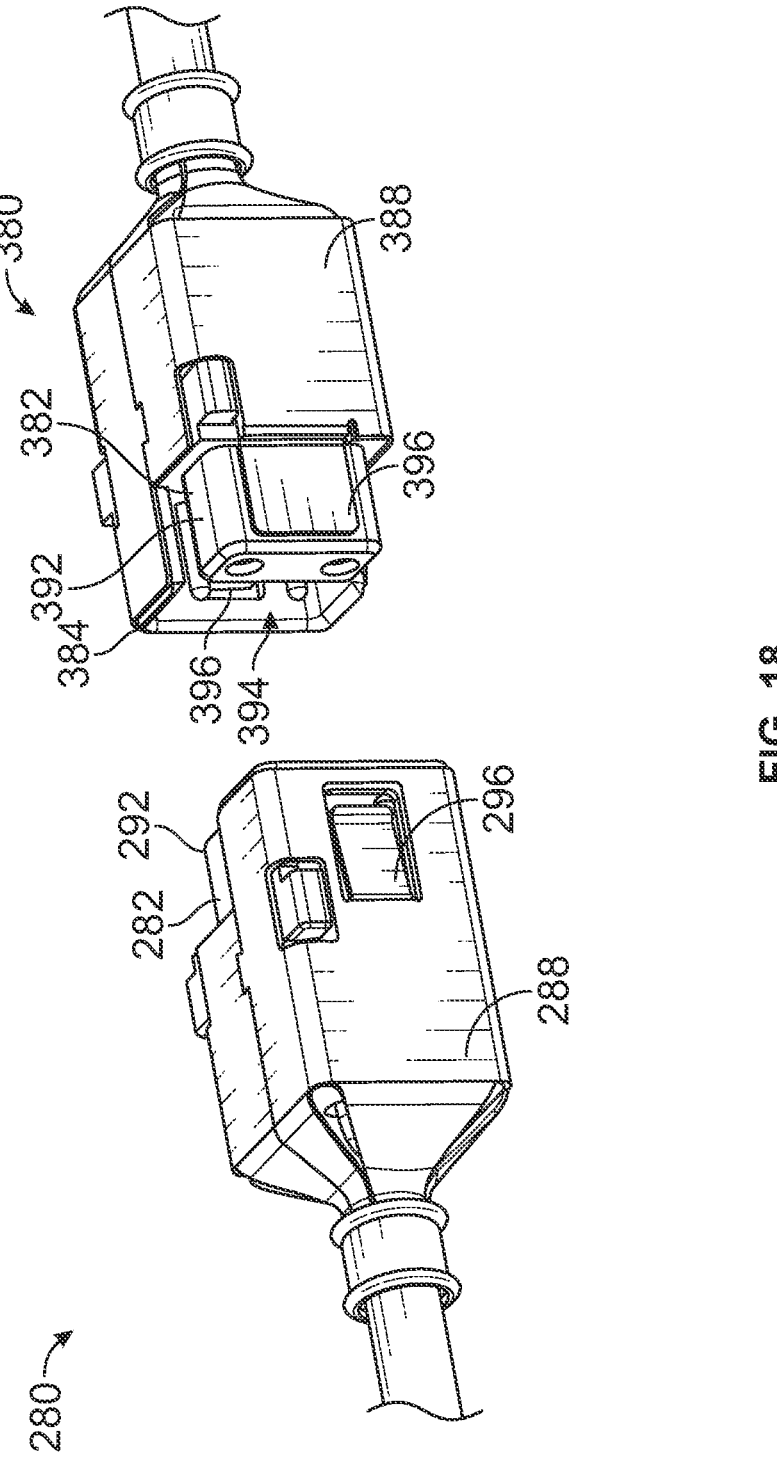
FIG. 18 is a perspective view of a portion of the charging system showing the supply data communication module and the receive data communication module poised for mating with each other in accordance with an exemplary embodiment.
Figure 19:
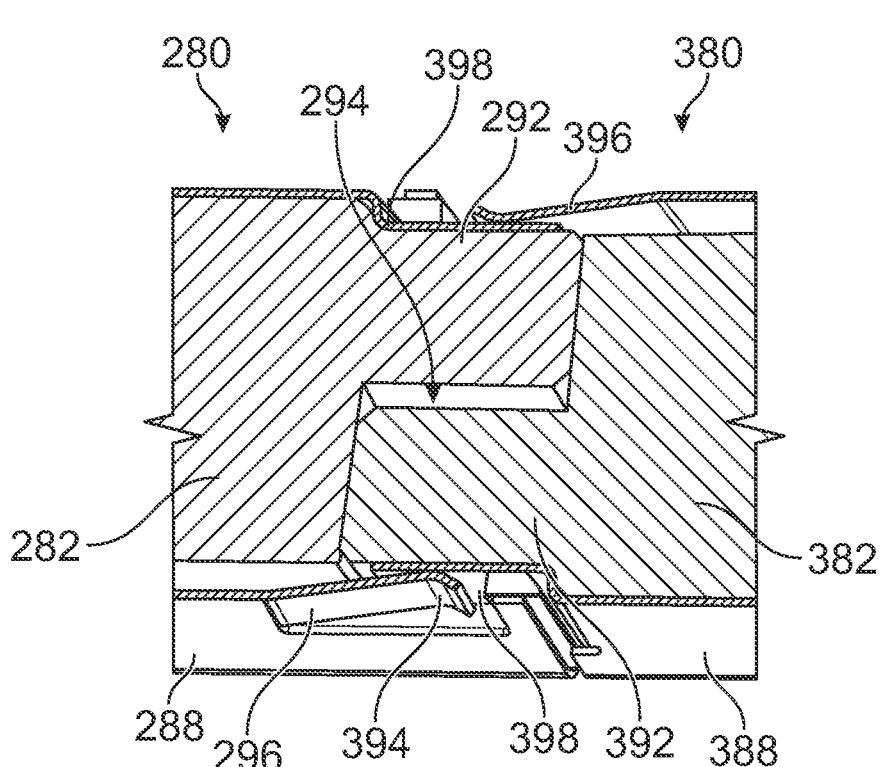
FIG. 19 is a cross-sectional view of the supply data communication module and the receive data communication module mating with each other in accordance with an exemplary embodiment.
Figure 20:
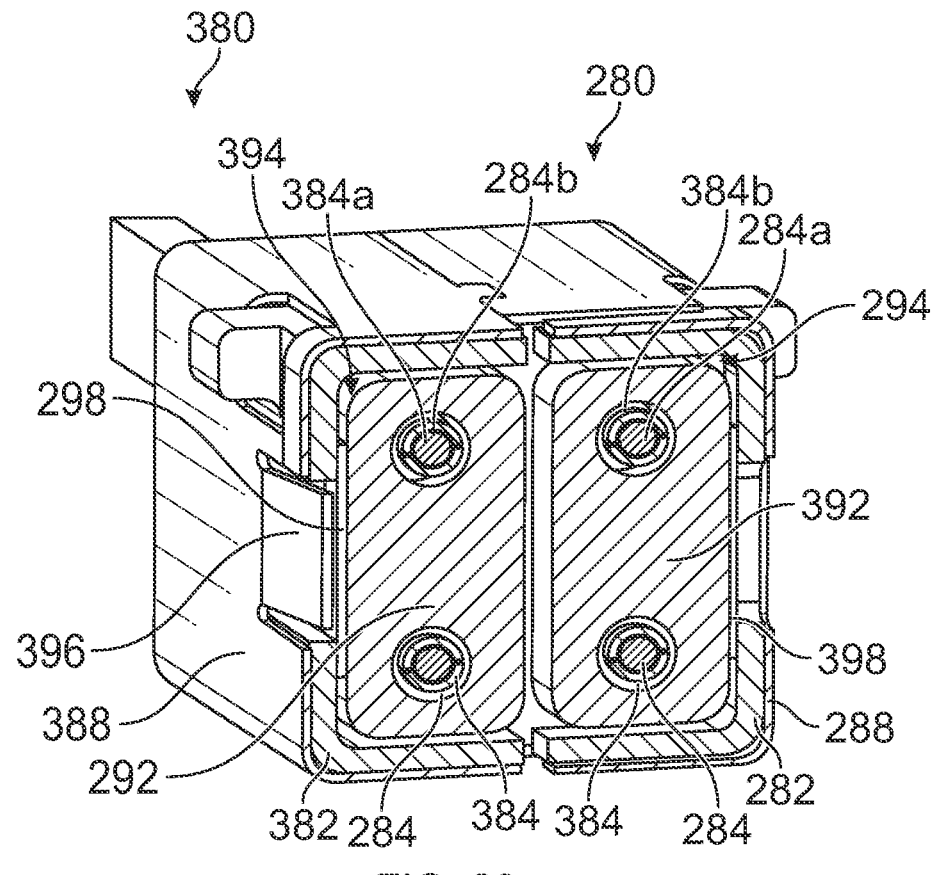
FIG. 20 is a cross-sectional view of the supply data communication module and the receive data communication module mating with each other in accordance with an exemplary embodiment.

FIG. 18 is a perspective view of a portion of the charging system 100 showing the supply data communication module 280 and the receive data communication module 280 poised for mating with each other. FIG. 19 is a cross-sectional view of the supply data communication module 280 and the receive data communication module 280 mating with each other. FIG. 20 is a cross-sectional view of the supply data communication module 280 and the receive data communication module 280 mating with each other.

In an exemplary embodiment, the data communication module housings 282, 382 and the data communication module contacts 284, 384 form a hermaphroditic mating interface. The pin contacts 284*a*, 384*a* are configured to be mated with the socket contacts 284*b*, 384*b*. The extensions 292, 392 of the data communication module housings 282, 382 are configured to be received in the pockets 294, 394 of the data communication module housings 282, 382. The data communication module shields 288, 388 are configured to be electrically connected when mated. For example, the mating beams 296, 396 are mated with the mating pads 298, 398.

Figure 21:
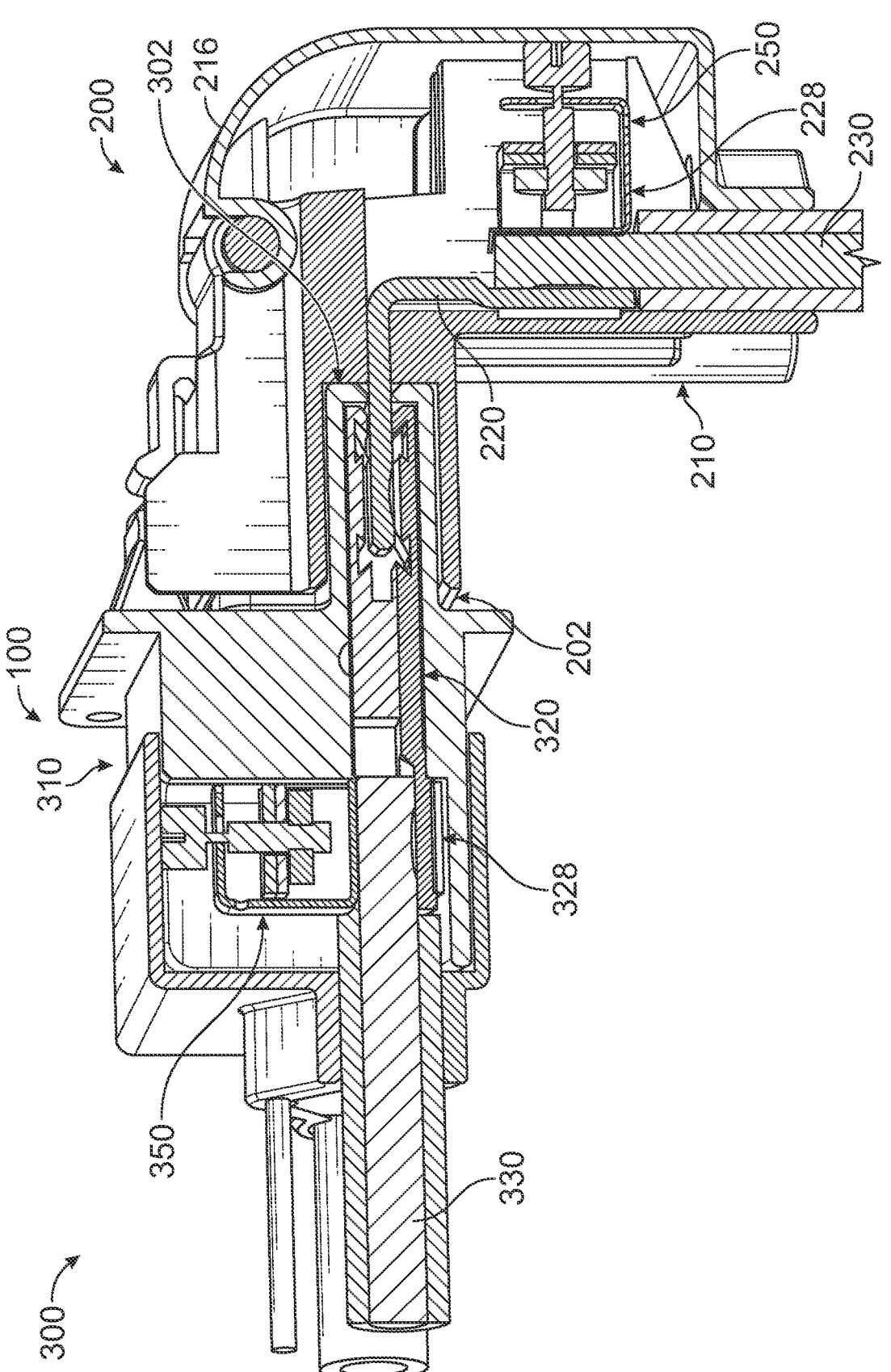
FIG. 21 is a cross sectional view of a portion of the charging system showing the supply charging device coupled to the mobile charging device in accordance with an exemplary embodiment.

FIG. 21 is a cross sectional view of a portion of the charging system 100 showing the supply charging device 200 coupled to the mobile charging device 300. The mating end 202 of the supply charging device 200 is plugged onto the mating end 302 of the mobile charging device 300. The supply power contacts 220 are coupled to the receive power contacts 320. For example, the blades are plugged into the sockets.

In an exemplary embodiment, the cable clamps 250, 350 at the terminating ends 228, 328 of the contacts 220, 320 are electrically connected to the power cables 230, 330 at separable terminating interfaces. In the illustrated embodiment, the supply power cable 230 is oriented perpendicular to the receive power cable 330. For example, the supply power cable 230 is oriented vertically and the receive power cable 330 is oriented horizontally. The supply power cable 230 and/or the receive power cable 330 may exit the respective housing at other angles in alternative embodiments and may be oriented at other non-parallel or non-perpendicular orientations. In an exemplary embodiment, the supply power contact 220 is a right-angle contact to orient the cable clamp 250 at the terminating end 228 perpendicular to the cable clamp 350 at the terminating end 328. The cable clamps 250, 350 clamp in perpendicular directions. The cables 230 are able to hang straight down-ward from the supply power connector 210 when plugged onto the receive power connector 310. As such, pressure and strain on the cables 230 is reduced compared to connectors having the cables extending parallel to the mating axis, which then bend 90° downward rearward of the connector. Such bends in the cables cause strain between the cables and the contacts, which may lead to failure over time. The cover 216 clamps the supply power cables 230 when closed to provide strain relief for the supply power cables 230.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention with-out departing from its scope. Dimensions, types of materials, orientations of the various components, and the number and positions of the various components described herein are intended to define parameters of certain embodiments, and are by no means limiting and are merely exemplary embodi-ments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112, sixth paragraph, unless and until such claim limitations expressly use the phrase "means for" followed by a statement of function void of further structure.

What is claimed is:

1. A supply charging device for a mobile device, the supply charging device comprising:

a supply power connector having a supply housing extending between a front and a rear, the supply hous-ing having a top and a bottom, the supply power connector having a mating end at the front, the mating end configured to be mated with a receive power connector of the mobile device along a mating axis, the supply power connector having a cable end at the bottom, the supply housing including a supply contact chamber at the mating end and a supply cable chamber at the cable end, the supply power connector including supply power contacts in the supply contact chamber for mating with the receive power connector along the mating axis, the supply power contacts including cable clamps movable between clamped positions and released positions, the supply power connector includ-ing a data communication module at the mating end for electrical connection with the receive power connector; and a cable assembly coupled to the supply power connector and extending from the cable end at the bottom of the supply housing, the cable assembly including supply power cables terminated to the corresponding supply power contacts, the supply power cables including cable conductors, wherein ends of the cable conductors are configured to be directly received in the corre-sponding cable clamps and configured to be electrically connected directly to the cable clamps of the supply power contacts in the clamped positions at separable interfaces, the supply power cables extending along cable axes oriented non-parallel to the mating axis.

2. The supply charging device of claim 1, wherein the supply power cables are terminated to the supply power contacts at separable terminating interfaces.

3. The supply charging device of claim 1, wherein supply power cables extend along linear paths through the supply cable chamber from the supply power contacts to the bottom of the supply housing.

4. The supply charging device of claim 1, wherein the cable axes of the supply power cables are oriented generally perpendicular to the mating axis.

5. The supply charging device of claim 1, wherein the supply power cables exit the supply housing at an angle between 30° and 90° relative to the mating axis.

6. The supply charging device of claim 1, wherein each supply power contact includes a body extending between a mating end and a terminating end, the terminating end extending into the supply cable chamber to terminate to the supply power cable, the mating end being oriented perpen-dicular to the terminating end.

7. The supply charging device of claim 6, wherein the terminating end includes the cable clamp configured to clamp directly to the cable conductor of the supply power cable.

8. The supply charging device of claim 1, wherein the cable clamp of each supply power contact includes a cable space between a base and a clamp member, the clamp member being movable relative to the base between the clamped position and the released position, wherein a size of the cable space is smaller in the clamped position, the end of the supply power cable being received in the cable space and mechanically and electrically connected to the cable clamp between the base and the clamp member when in the clamped position.

9. The supply charging device of claim 8, wherein the cable clamp includes a set screw operably coupled between the base and the clamp member, the set screw being tight-ened to move the clamp member from the released position to the clamped position to clamp to the end of the supply power cable.

10. The supply charging device of claim 1, wherein the data communication module includes a data communication module housing holding data communication module con-tacts and data communication module wires extending from the data communication module contacts, the data commu-nication module housing and the data communication mod-ule contacts forming a hermaphroditic mating interface at a mating end of the data communication module configured to be mated with a data communication module of the receive power connector.

11. The supply charging device of claim 10, wherein the data communication module includes a data communication module shield surrounding the data communication module housing, the data communication module shield being elec-trically connected to a wire shield of the data communica-tion module wire.

12. The supply charging device of claim 1, wherein the supply housing includes a main body and a cover coupled to the main body, the cover being opened to expose the supply cable chamber to terminate the supply power contacts to the supply power cables.

13. The supply charging device of claim 12, wherein the cover is rotatably coupled to the main body at a cover axle.

14. The supply charging device of claim 12, wherein the cover forms a covered space, the data communication module including a data communication module wire extending through the covered space from the main body to the cable end to exit the supply housing at the bottom of the supply housing.

15. The supply charging device of claim 12, wherein the cover is coupled to the main body at the rear.

16. The supply charging device of claim 12, wherein the cover is secured to the main body to compress the supply power cables between the main body and the cover to provide cable strain relief for the supply power cables.

17. A supply charging device for a mobile device, the supply charging device comprising:

a supply power connector having a supply housing extending between a front and a rear, the supply housing having a top and a bottom, the supply power connector having a mating end at the front, the mating end configured to be mated with a receive power connector of the mobile device along a mating axis, the supply power connector having a cable end at the bottom, the supply housing including a supply contact chamber at the mating end and a supply cable chamber at the cable end, the supply power connector including supply power contacts in the supply contact chamber for mating with the receive power connector along the mating axis, each supply power contact including a cable clamp including a cable space between a base and a clamp member, the clamp member moveable relative to the base between a clamped position and a released position, wherein a size of the cable space is smaller in the clamped position, the supply power connector including a data communication module at the mating end for electrical connection with the receive power connector; and a cable assembly coupled to the supply power connector and extending from the cable end at the bottom of the supply housing, the cable assembly including supply power cables terminated to the corresponding supply power cables extending along cable axes oriented non-parallel to the mating axis, each supply power cable including an end received in the cable space of the corresponding cable clamp, wherein the end of the supply power cable is compression connected between the base and the clamp member when in the clamped position, wherein the cable clamp includes a set screw operably coupled between the base and the clamp member, the set screw being tightened to move the clamp member from the released position to the clamped position to clamp to the end of the supply power cable.

18. The supply charging device of claim 17, wherein the supply housing includes a main body and a cover coupled to the main body, the cover being opened to expose the supply cable chamber to terminate the supply power contacts to the supply power cables, the cover being secured to the main body to compress the supply power cables between the main body and the cover to provide cable strain relief for the supply power cables.

19. A charging system comprising:

a mobile charging device having a receive housing extending between a front and a rear, the receive housing having a top and a bottom, the receive power connector having a mating end at the front, the receive power connector having a cable end, the receive housing including a receive contact chamber at the mating end and a receive cable chamber at the cable end, the receive power connector including receive power contacts in the receive contact chamber, the receive power connector including a receive data communication module at the mating end, the mobile charging device including a receive cable assembly coupled to the receive power connector and extending from the cable end, the receive cable assembly including receive power cables terminated to the corresponding receive power contacts; and a supply charging device including a supply power connector having a supply housing extending between a front and a rear, the supply housing having a top and a bottom, the supply power connector having a mating end at the front, the mating end being mated with the mating end of the receive power connector along a mating axis, the supply power connector having a cable end at the bottom, the supply housing including a supply contact chamber at the mating end and a supply cable chamber at the cable end, the supply power connector including supply power contacts in the supply contact chamber for mating with the corresponding receive power contacts along the mating axis, the supply power connector including a supply data communication module at the mating end for electrical connection with the receive data communication module of the receive power connector, the supply charging device including a supply cable assembly coupled to the supply power connector and extending from the cable end at the bottom of the supply housing, the supply cable assembly including supply power cables terminated to the corresponding supply power contacts, the supply power cables extending along cable axes oriented non-parallel to the mating axis.

20. The charging system of claim 19, wherein the receive cable end is at the rear of the receive housing.

21. The charging system of claim 19, wherein the supply power cables extend along linear paths through the supply cable chamber from the supply power cables to the bottom of the supply housing, the supply power cables being oriented perpendicular to the receive power contacts.

22. The charging system of claim 19, wherein:

each supply power contact includes a cable clamp having a cable space between a base and a clamp member, the clamp member being movable relative to the base between a clamped position and a released position, wherein a size of the cable space is smaller in the clamped position, an end of the supply power cable being received in the cable space and mechanically and electrically connected to the cable clamp between the base and the clamp member when in the clamped position; and each receive power contact includes a cable clamp having a cable space between a base and a clamp member, the clamp member being movable relative to the base between a clamped position and a released position, wherein a size of the cable space is smaller in the clamped position, an end of the receive power cable being received in the cable space and mechanically and electrically connected to the cable clamp between the base and the clamp member when in the clamped position.

* * * * *